(12) United States Patent
Li et al.

(10) Patent No.: US 11,265,770 B2
(45) Date of Patent: Mar. 1, 2022

(54) COMMUNICATION METHOD AND APPARATUS FOR USE IN AN INACTIVE STATE

(71) Applicant: HUAWEI TECHNOLOGIES CO., LTD., Shenzhen (CN)

(72) Inventors: Bingzhao Li, Beijing (CN); Wei Quan, Beijing (CN); Jian Zhang, Beijing (CN); Li Chai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 107 days.

(21) Appl. No.: 16/675,169

(22) Filed: Nov. 5, 2019

(65) Prior Publication Data

US 2020/0077307 A1 Mar. 5, 2020

Related U.S. Application Data

(63) Continuation of application No. PCT/CN2017/083266, filed on May 5, 2017.

(51) Int. Cl.
*H04W 36/00* (2009.01)
*H04W 36/08* (2009.01)

(52) U.S. Cl.
CPC ....... *H04W 36/0033* (2013.01); *H04W 36/08* (2013.01)

(58) Field of Classification Search
CPC . H04W 36/36; H04W 36/0016; H04W 36/00; H04W 36/0011; H04W 36/08;
(Continued)

(56) References Cited

U.S. PATENT DOCUMENTS

2010/0008327 A1* 1/2010 Son .................. H04W 8/26
370/331
2010/0260142 A1* 10/2010 Jung .................. H04W 80/04
370/331
(Continued)

FOREIGN PATENT DOCUMENTS

| CN | 102625276 A | 8/2012 |
| WO | 2016164083 A1 | 10/2016 |
| WO | 2017000863 A1 | 1/2017 |

OTHER PUBLICATIONS

LG Electronics Inc., Procedure details related to RRC_Inactive. 3GPP TSG-RAN WG2 Meeting #97bis, Spokane, USA, Apr. 3, 2017, R2-1702787, 5 pages.
(Continued)

*Primary Examiner* — Allahyar Kasraian
(74) *Attorney, Agent, or Firm* — Rimon PC

(57) ABSTRACT

A communication method and apparatus are provided. The method can be performed by a first access network device. Under the method, first data transmission information sent by a terminal device can be received. The first data transmission information carries a first identifier and uplink data, and the first identifier includes an identifier identifying an anchor access network device and an identifier identifying the terminal device in the anchor access network device. First processing can be performed on the received uplink data based on channel configuration information of the terminal device. The first processing includes at least one of: physical layer processing, medium access control layer processing, or radio link control layer processing. The first processing includes no decryption and/or integrity check. Second data transmission information can be sent. The second data transmission information carries the first identifier and uplink data obtained after the first processing.

4 Claims, 10 Drawing Sheets

(58) Field of Classification Search
CPC .......... H04W 36/02; H04W 36/0085; H04W 36/0055; H04W 36/005; H04W 36/0038; H04W 36/14
See application file for complete search history.

(56) References Cited

U.S. PATENT DOCUMENTS

| | | | |
|---|---|---|---|
| 2012/0243507 A1* | 9/2012 | Du ................... | H04W 36/0072 370/331 |
| 2013/0059565 A1* | 3/2013 | Jung ................... | H04W 36/14 455/411 |
| 2016/0142308 A1 | 5/2016 | Gage et al. | |
| 2017/0374612 A1 | 12/2017 | Stojanovski et al. | |
| 2018/0234839 A1* | 8/2018 | Tenny ............... | H04W 36/0033 |
| 2020/0045591 A1* | 2/2020 | Yokoyama ............ | H04W 48/20 |

OTHER PUBLICATIONS

3GPP TSG RAN WG2 Meeting #95,R2-164807,:"Support Data Transmission in Inactive State",CATT,Gothenburg, Sweden, Aug. 22-26, 2016, total 10 pages.

3GPP TSG-RAN WG2 Meeting#96,R2-167706,:"Data transmission in Inactive",Nokia, Alcatel-Lucent Shanghai Bell, Reno, USA, Nov. 14-18, 2016 ,total 8 pages.

Huawei, "General considerations for RRC_Inactive in RAN3", 3GPP TSG-RAN WG3 # 95bis, R3-171224 , Apr. 7, 2017 (Apr. 7, 2017), total 3 pages.

Panasonic, "RAN Update Procedure in RRC-Inactive", 3GPP TSG-RAN WG2 Meeting # 97bis, R2-1702732 , Apr. 7, 2017 (Apr. 7, 2017), total 3 pages.

Nokia et al., "Paging initiation in inactive state", 3GPP TSG-RAN WG3 Meeting # 97bis, R2-1702764 , Apr. 7, 2017 (Apr. 7, 2017), total 3 pages.

3GPP TS 36.331 V14.2.2 (Apr. 2017);3rd Generation Partnership Project;Technical Specification Group Radio Access Network;Evolved Universal Terrestrial Radio Access (E-UTRA);Radio Resource Control (RRC);Protocol specification (Release 14);total 721 pages.

3GPP TS 36.413 V14.2.0 (Mar. 2017);3rd Generation Partnership Project;Technical Specification Group Radio Access Network;Evolved Universal Terrestrial Radio Access Network(E-UTRAN);S1 Application Protocol (S1AP)(Release 14); total 342 pages.

* cited by examiner

COMMUNICATION METHOD AND APPARATUS FOR USE IN AN INACTIVE STATE

CROSS-REFERENCE TO RELATED APPLICATIONS

This application is a continuation of International Application No. PCT/CN2017/083266, filed on May 5, 2017, the disclosure of which is hereby incorporated by reference in its entirety.

TECHNICAL FIELD

The present disclosure relates to the communications field, and in particular, to a communication method and an apparatus.

BACKGROUND

As communications technologies develop, a third state appears for a terminal device in addition to a connected state and an idle state. In the connected state, the terminal device saves its own context information, and can perform switching controlled by an access network device. In the idle state, the terminal device releases its own context information, and can perform cell-based reselection. In the third state, the terminal device saves its own context information and can perform a cell-based reselection operation. In addition, connection information of the terminal device is saved on an anchor access network device, and includes the context information of the terminal device and core network connection information.

In the third state, the terminal device saves management area information configured by an anchor access network device. When moving out of a management area corresponding to the management area information, the terminal device needs to notify the anchor access network device that the terminal device moves out of the management area. The third state may be referred to as an inactive state, a lightly connected state, a deactivated state, a low overhead state, or the like. The management area may be also referred to as a paging area (Paging Area), an access network location tracking area, or the like.

In the third state, when moving to a cell of another access network device and needing to send data, the terminal device initiates a connection restoration process to a serving access network device, and the serving access network device instructs the anchor access network device to switch the context of the terminal device to the serving access network device. Each time the terminal device changes a serving access network device, the terminal device needs to transfer the context and switch an interface once; and each time an anchor access network device is changed, a key of the terminal device needs to be updated. Therefore, relatively heavy signaling and delay overheads are caused in a moving process of the terminal device.

SUMMARY

Embodiments of the present disclosure provide a communication method and apparatus.

According to a first aspect, an embodiment of the present disclosure provides a communication method, including: receiving, by a first access network device, first data transmission information sent by a terminal device, where the first data transmission information carries a first identifier and uplink data, and the first identifier includes an identifier used to identify an anchor access network device and an identifier used to identify the terminal device in the anchor access network device; performing, by the first access network device, first processing on the received uplink data based on channel configuration information of the terminal device, where the first processing includes at least one of the following: physical layer processing, medium access control layer processing, and radio link control layer processing; in addition, the first processing includes no decryption and/or integrity check; and sending, by the first access network device, second data transmission information to the anchor access network device, where the second data transmission information carries the first identifier and uplink data obtained after the first processing. Data and the first identifier for identifying the anchor access network device are carried in the data transmission information, so that the first access network device and the anchor access network device separately process the received data, and when the terminal device is in a moving process, the anchor access network device remains unchanged and the terminal device can perform data transmission, thereby avoiding a waste of signaling resources in key update of the terminal device and centralized data processing in a conventional method due to a change of the anchor access network device.

In a possible implementation, before the sending, by the first access network device, second data transmission information to the anchor access network device, a common channel is pre-established between the anchor access network device and the first access network device and/or channel configuration information used by a third-state terminal device to perform data transmission is preconfigured between the anchor access network device and the first access network device, and the first access network device sends the second data transmission information to the anchor access network device by using the common channel and/or the channel configuration information. A transmission delay of data transmission between the first access network device and the anchor access network device is reduced by pre-establishing the common channel and/or configuring the channel configuration information used by the third-state terminal device to perform data transmission. This method works for all terminal devices, and therefore signaling resources are saved.

In a possible implementation, the first access network device sends a context request message to the anchor access network device, and sends the second data transmission information to the anchor access network device by adding the second data transmission information to the context request message.

In a possible implementation, the channel configuration information is obtained in at least one of the following manners: reading the predefined channel configuration information; receiving a channel configuration index from the terminal device, and determining the channel configuration information based on the channel configuration index; and obtaining the channel configuration information from the anchor access network device.

In a possible implementation, the first access network device receives third data transmission information sent by the anchor access network device; the third data transmission information carries the first identifier and downlink data obtained after third processing, and the third processing includes at least one of the following: medium access control layer processing, radio link control layer processing, and packet data convergence protocol layer processing; the first access network device performs fourth processing on the received downlink data obtained after the third processing, where the fourth processing includes at least one of the following: physical layer processing, medium access control layer processing, and radio link control layer processing; in addition, the fourth processing includes no decryption and/or integrity check; and the first access network device sends, based on a second identifier, data obtained after the fourth processing to the terminal device, where the second identifier is a dedicated identifier used by the terminal device in a current cell.

According to a second aspect, an embodiment of the present disclosure provides a communication method, including: receiving, by a terminal device, a first message sent by an anchor access network device, where the first message carries a first identifier, and the first identifier includes an identifier used to identify the anchor access network device and an identifier used to identify the terminal device in the anchor access network device; and sending, by the terminal device, first data transmission information to a first access network device, where the first data transmission information carries the first identifier and uplink data.

In some embodiments, the first message further carries a channel configuration index.

In a possible implementation, after the sending, by the terminal device, first data transmission information to a first access network device, the method further includes: receiving, by the terminal device based on a second identifier, downlink data obtained after fourth processing performed by the first access network device, where the fourth processing includes at least one of the following: physical layer processing, medium access control layer processing, and radio link control layer processing; in addition, the fourth processing includes no decryption and/or integrity check; and the second identifier is a dedicated identifier used by the terminal device in a current cell.

In a possible implementation, the terminal device stops, based on a first condition, monitoring the second identifier, and ends a data transmission process. The first condition includes the following: After receiving downlink data, the terminal device receives no more downlink data, and has no uplink data to send in a period of time; or the terminal device receives a release instruction message, where the release instruction message instructs the terminal device to stop monitoring the second identifier.

According to a third aspect, an embodiment of the present disclosure provides a communication method, including: sending, by an anchor access network device, a first message to a terminal device, where the first message carries a first identifier, and the first identifier includes an identifier used to identify the anchor access network device and an identifier used to identify the terminal device in the anchor access network device; receiving, by the anchor access network device, second data transmission information sent by a first access network device, where the second data transmission information carries the first identifier and uplink data obtained after first processing performed by the first access network device, and the first processing includes at least one of the following: physical layer processing, medium access control layer processing, and radio link control layer processing; in addition, the first processing includes no decryption and/or integrity check; and performing, by the anchor access network device, second processing on uplink data obtained after the first processing, and sending uplink data obtained after the second processing to a core network device, where the second processing includes at least one of the following: medium access control layer processing, radio link control layer processing, and packet data convergence protocol layer processing.

In some embodiments, the first message further carries a channel configuration index.

In a possible implementation, before the receiving, by the anchor access network device, second data transmission information sent by a first access network device, a common channel is pre-established between the anchor access network device and the first access network device and/or channel configuration information used by a third-state terminal device to perform data transmission is preconfigured between the anchor access network device and the first access network device, and the anchor access network device receives, by using the common channel or the channel configuration information, the second data transmission information sent by the first access network device.

In a possible implementation, the anchor access network device receives a context request message sent by the first access network device, and the second data transmission information is carried in the context request message.

In a possible implementation, after the sending, by the anchor access network device, uplink data obtained after the second processing to a core network device, the method further includes: receiving, by the anchor access network device, downlink data sent by the core network device; performing, by the anchor access network device, third processing on the received downlink data, where the third processing includes at least one of the following: medium access control layer processing, radio link control layer processing, and packet data convergence protocol layer processing; and sending, by the anchor access network device, third data transmission information to the first access network device, where the third data transmission information carries the first identifier and downlink data obtained after the third processing.

According to a fourth aspect, an embodiment of this application provides a communication method, including: receiving, by a terminal device, a first message sent by an anchor access network device, where the first message carries a first identifier, and the first identifier includes an identifier used to identify the anchor access network device and an identifier used to identify the terminal device in the anchor access network device; receiving, by the terminal device, a paging message sent by a first access network device, where the paging message carries an indication message, to indicate whether the terminal device needs to perform state transition; and determining, by the terminal device based on the indication message, whether state transition needs to be performed.

In some embodiments, the first message further carries a channel configuration index.

In a possible implementation, after the terminal device determines, based on the indication message, that no state transition needs to be performed, the terminal device sends the first identifier to the first access network device.

In some embodiments, the first identifier is carried in a connection restoration message, and the connection restoration message further carries an indication indicating that a state of the terminal device remains unchanged. Alternatively, the first identifier is carried in a medium access control header or a medium access control control element.

In a possible implementation, the terminal device receives, based on a second identifier, downlink data obtained after second processing performed by the first access network device, where the second processing includes at least one of the following: physical layer processing, medium access control layer processing, and radio link control layer processing; in addition, the second processing includes no decryption and/or integrity check; and the second identifier is a dedicated identifier used by the terminal device in a current cell.

In some embodiments, after the terminal device receives, by using the second identifier, the downlink data obtained after the second processing, the terminal device sends uplink data to the first access network device.

In a possible implementation, the terminal device stops, based on a first condition, monitoring the second identifier, and ends a data transmission process.

In some embodiments, the first condition includes the following: After receiving downlink data, the terminal device receives no more downlink data, and has no uplink data to send in a period of time; or the terminal device receives a release instruction message, where the release instruction message instructs the terminal device to stop monitoring the second identifier.

According to a fifth aspect, an embodiment of this application provides a communication method, including: receiving, by a first access network device, a paging message sent by an anchor access network device, where the paging message carries an indication message, to indicate whether a terminal device needs to perform state transition; and sending, by the first access network device, the paging message to the terminal device.

In a possible implementation, after the sending, by the first access network device, the paging message to the terminal device, the first access network device receives a first identifier sent by the terminal device, where the first identifier includes an identifier used to identify the anchor access network device and an identifier used to identify the terminal device in the anchor access network device; and the first access network device sends the first identifier to the anchor access network device.

In a possible implementation, after the first access network device sends the first identifier to the anchor access network device, the first access network device receives first data transmission information sent by the anchor access network device, where the first data transmission information carries the first identifier and downlink data obtained after first processing performed by the anchor access network device, and the first processing includes at least one of the following: medium access control layer processing, radio link control layer processing, and packet data convergence protocol layer processing.

In a possible implementation, before the first access network device receives the first data transmission information sent by the anchor access network device, a common channel is pre-established between the anchor access network device and the first access network device and/or channel configuration information used by a third-state terminal device to perform data transmission is preconfigured between the anchor access network device and the first access network device, and the first access network device receives, by using the common channel or the channel configuration information, the first data transmission information sent by the anchor access network device.

In some embodiments, the first access network device receives a context request message sent by the anchor access network device, and the first data transmission information is carried in the context request message.

In some embodiments, the first data transmission information further carries a channel configuration index of the terminal device.

In a possible implementation, after the first access network device receives the first data transmission information sent by the anchor access network device, the first access network device performs, based on the channel configuration information of the terminal device, second processing on downlink data obtained after the first processing, where the second processing includes at least one of the following: physical layer processing, medium access control layer processing, and radio link control layer processing; in addition, the second processing includes no decryption and/or integrity check.

In a possible implementation, after the first access network device performs, based on the channel configuration information of the terminal device, the second processing on the received downlink data obtained after the first processing, the first access network device sends, based on a second identifier, downlink data obtained after the second processing to the terminal device, where the second identifier is a dedicated identifier used by the terminal device in a current cell; and the first access network device receives uplink data sent by the terminal device.

In a possible implementation, after the first access network device receives the uplink data sent by the terminal device, the first access network device performs third processing on the received uplink data, where the third processing includes at least one of the following: physical layer processing, medium access control layer processing, and radio link control layer processing; in addition, the third processing includes no decryption and/or integrity check. The first access network device sends second data transmission information to the anchor access network device, where the second data transmission information carries the first identifier and uplink data obtained after the third processing.

According to a sixth aspect, an embodiment of this application provides a communication method, including: sending, by an anchor access network device, a first message to a terminal device, where the first message carries a first identifier, and the first identifier includes an identifier used to identify the anchor access network device and an identifier used to identify the terminal device in the anchor access network device; receiving, by the anchor access network device, downlink data sent by a core network device; and sending, by the anchor access network device, a paging message to a first access network device, where the paging message carries an indication message, to indicate whether the terminal device needs to perform state transition.

In some embodiments, the first message further carries a channel configuration index.

In a possible implementation, after the sending, by the anchor access network device, a paging message to a first access network device, the anchor access network device receives the first identifier sent by the first access network device. The anchor access network device determines whether the terminal device accesses the anchor access network device from the first access network device, and performs first processing on downlink data received from the core network device, where the first processing includes at least one of the following: medium access control layer processing, radio link control layer processing, and packet data convergence protocol layer processing.

In a possible implementation, after the anchor access network device performs the first processing on the downlink data received from the core network device, the anchor access network device sends first data transmission information to the first access network device, where the first data transmission information carries the first identifier and downlink data obtained after the first processing.

In a possible implementation, before the anchor access network device sends the first data transmission information to the first access network device, a common channel is pre-established between the anchor access network device and the first access network device and/or channel configuration information used by a third-state terminal device to perform data transmission is preconfigured between the anchor access network device and the first access network device, and the anchor access network device sends the first data transmission information to the first access network device by using the common channel and/or the channel configuration information.

In a possible implementation, the anchor access network device sends a context request message to the first access network device, and the first data transmission information is carried in the context request message.

In some embodiments, the first data transmission information further carries a channel configuration index of the terminal device.

In a possible implementation, after the anchor access network device sends the first data transmission information to the first access network device, the anchor access network device receives second data transmission information sent by the first access network device, where the second data transmission information carries the first identifier and uplink data obtained after third processing, and the third processing includes at least one of the following: physical layer processing, medium access control layer processing, and radio link control layer processing; in addition, the third processing includes no decryption and/or integrity check. The anchor access network device performs fourth processing on uplink data obtained after the third processing, where the fourth processing includes at least one of the following: MAC layer processing, RLC layer processing, and PDCP layer processing. The anchor access network device sends uplink data obtained after the fourth processing to the core network device.

According to a seventh aspect, an embodiment of this application provides a communications apparatus, to perform the method in any one of the first aspect or the possible implementations of the first aspect. Specifically, the apparatus includes units configured to perform the method in any one of the first aspect or the possible implementations of the first aspect.

According to an eighth aspect, an embodiment of this application provides a communications apparatus, configured to perform the method in any one of the second aspect or the possible implementations of the second aspect. Specifically, the apparatus includes units configured to perform the method in any one of the second aspect or the possible implementations of the second aspect.

According to a ninth aspect, an embodiment of this application provides a communications apparatus, configured to perform the method in the third aspect. Specifically, the apparatus includes units configured to perform the method in any one of the third aspect or the possible implementations of the third aspect.

According to a tenth aspect, an embodiment of this application provides a communications apparatus, configured to perform the method in the fourth aspect. Specifically, the apparatus includes units configured to perform the method in any one of the fourth aspect or the possible implementations of the fourth aspect.

According to an eleventh aspect, an embodiment of this application provides a communications apparatus, configured to perform the method in the fifth aspect. Specifically, the apparatus includes units configured to perform the method in any one of the fifth aspect or the possible implementations of the fifth aspect.

According to a twelfth aspect, an embodiment of this application provides a communications apparatus, configured to perform the method in the sixth aspect. Specifically, the apparatus includes units configured to perform the method in any one of the sixth aspect or the possible implementations of the sixth aspect.

According to a thirteenth aspect, an embodiment of this application provides a communications apparatus, where the apparatus includes an input interface, an output interface, a processor, and a memory. The input interface, the output interface, the processor, and the memory may be interconnected by using a bus system. The memory is configured to store a program, an instruction, or code. The processor is configured to execute the program, the instruction, or the code in the memory, so that the communications apparatus completes the method in any one of the possible implementations of the foregoing aspects.

According to a fourteenth aspect, an embodiment of this application provides a computer readable storage medium on which a computer program (instruction) is stored. When the program (instruction) is run on a computer, the computer is enabled to perform the method in any one of the foregoing aspects.

According to a fifteenth aspect, this application provides a chip system. The chip system includes a processor, configured to support a communications apparatus in implementing functions in the foregoing aspects, for example, receiving or processing the data and/or the information in the foregoing methods. In a possible design, the chip system further includes a memory, where the memory is configured to store a program instruction and data necessary for the communications apparatus. The chip system may include a chip, or may include a chip and another discrete device.

DESCRIPTION OF EMBODIMENTS

A terminal device in the embodiments of the present disclosure may be a device that provides a user with voice and/or data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, a personal digital assistant (PDA), or the like. The wireless terminal may also be referred to as a system, a subscriber unit, a subscriber station, a mobile station, a mobile terminal, a remote station, an access point, a remote terminal, an access terminal, a user terminal, a user agent, a terminal device, or user equipment.

An access network device in the embodiments of the present disclosure is a device that is connected to a terminal device, receives data from the terminal device, and sends the data to a core network (CN). In different systems, the access network device corresponds to different devices. For example, the access network device may be a base station (BS) and a base station controller (BSC) in a 2G system, may be a NodeB and a radio network controller (RNC) in a 3G system, may be an evolved NodeB (eNB or e-NodeB) in a 4G system, or may be a corresponding access network device in a 5G system. This is not limited herein.

Figure 1:
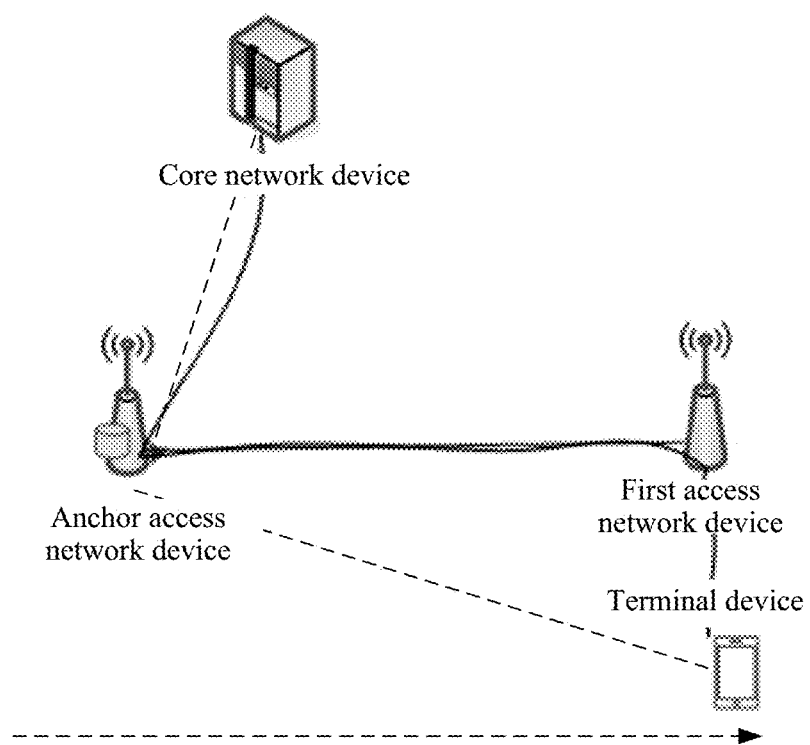
FIG. 1 is a schematic architectural diagram of a wireless communications system according to an embodiment of the present disclosure.

In a schematic architectural diagram of a wireless communications system shown in FIG. 1, a terminal device is in a third state, an S1 interface of the terminal device is anchored in an anchor access network device to configure a management area for the terminal device. The management area includes a cell in which the terminal device accesses the anchor access network device and one or more other cells than this cell. When moving inside the management area, the terminal device does not need to notify a network side of a location of the terminal device, and when moving out of the management area, the terminal device needs to notify the network side of the location of the terminal device. This process is referred to as management area update or paging area update. In the third state, the terminal device may be located in a cell of the anchor access network device, or may be located in a cell of another access network device.

In the schematic architectural diagram of the system in FIG. 1, a core network CN device is further included. In different systems, the CN device corresponds to different devices. For example, in a 4G system, the CN device corresponds to a mobility management entity (MME) and/or a serving gateway (S-GW), and in a 3G system, the CN device corresponds to a serving GPRS support node (SGSN), a gateway GPRS support node (GGSN), or the like. If the terminal device in the third state moves into a service scope of a first access network device, when needing to send data, the terminal device initiates a connection restoration process to the first access network device, and the first access network device sends a context request of the terminal device to the anchor access network device, and sends a path switching instruction to the CN to switch an S1 connection of the terminal device to the first access network device.

In a moving process of the terminal device, each time the terminal device changes one first access network device, the terminal device needs to transfer a context and switch an interface once, and each time the anchor access network device is changed, a key of the terminal device needs to be updated. Therefore, relatively heavy signaling and delay overheads are caused in the moving process of the terminal device.

Figure 2A:
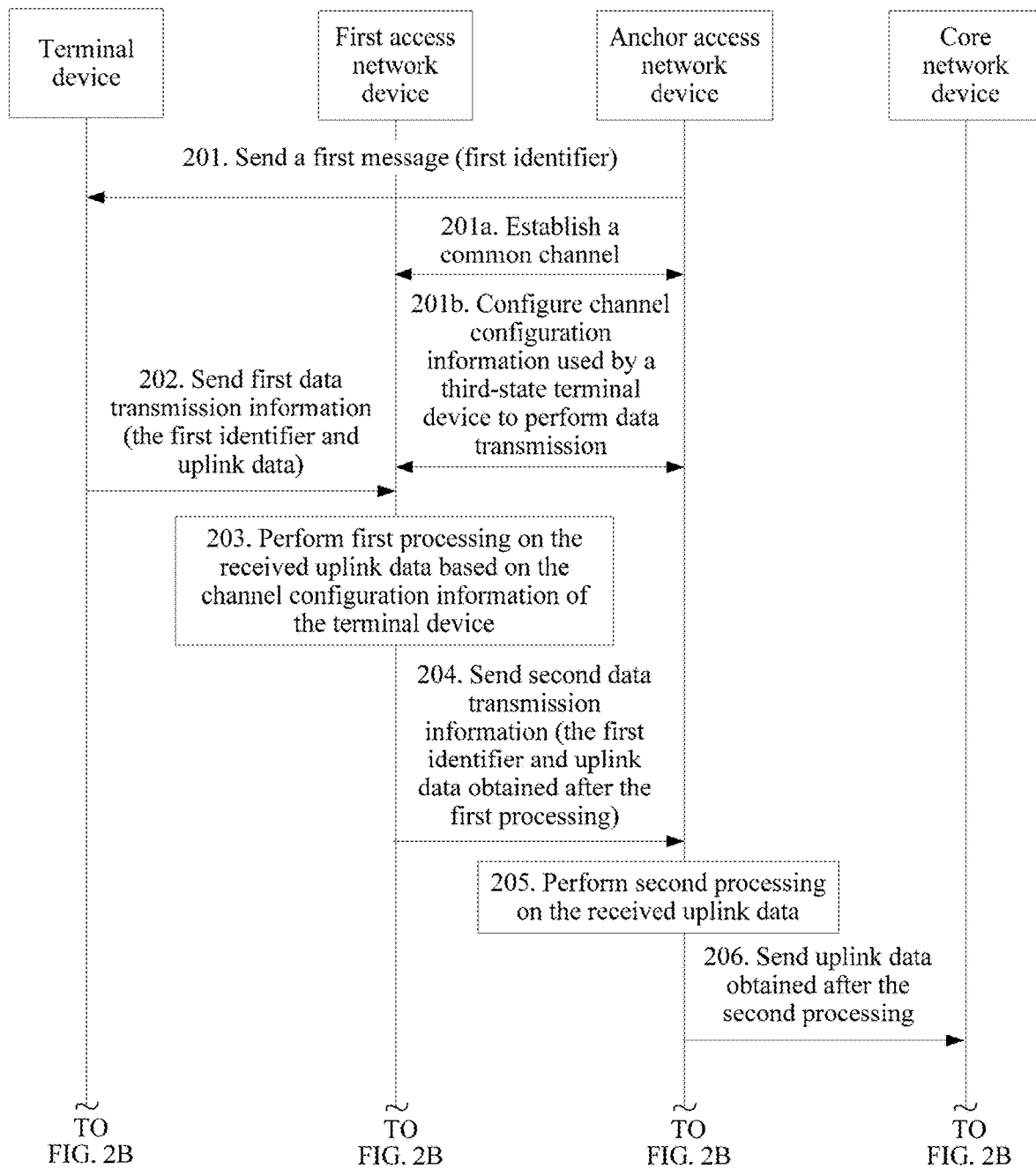
FIG. 2A and FIG. 2B are a flowchart of a communication method according to an embodiment of the present disclosure.
Figure 2B:
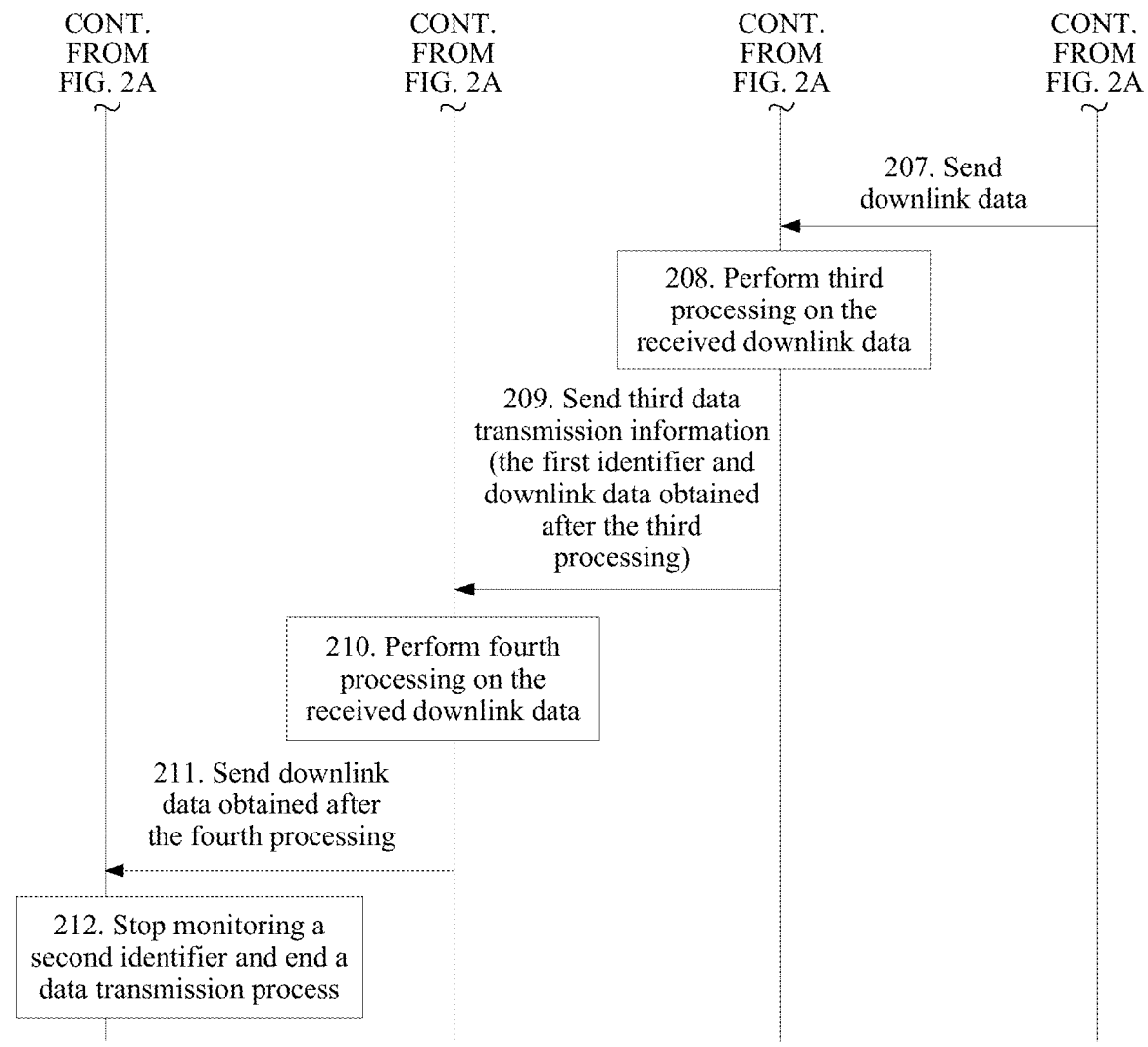

In view of the foregoing technical problem, one aspect of the embodiments of the present disclosure provides a communication method, as shown in FIG. 2A and FIG. 2B. The communication method may be applied to the network architecture shown in FIG. 1, and the method includes the following steps.

Step 201: An anchor access network device sends a first message to a terminal device, where the first message includes a first identifier, and the first identifier includes an identifier used to identify the anchor access network device and an identifier used to identify the terminal device in the anchor access network device.

In some embodiments, the first message further includes a channel configuration index. The channel configuration index is used to identify channel configuration information used by the terminal device in a third state. The channel configuration information includes at least one piece of the following information used by the terminal device: a logical channel number, a medium access control (MAC) layer, radio link control (RLC) layer configuration information, and packet data convergence protocol (PDCP) layer configuration information.

In addition, the anchor access network device further configures a management area for the terminal device. As described above, when moving inside the management area, the terminal device does not need to notify the anchor access network device that the terminal device moves inside the management area.

Step 202: The terminal device sends first data transmission information to a first access network device corresponding to a cell in which the terminal device is currently located, where the first data transmission information carries the first identifier and uplink data.

In this embodiment, the terminal device is in the third state. Before entering the third state, the terminal device is in a connected state, and when the terminal device is in the connected state, an access network device corresponding to a cell in which the terminal device is located is an anchor access network device. When the terminal device enters the third state from the connected state, the anchor access network device configures a management area for the terminal device, where the management area includes a cell in which the terminal device accesses the anchor access network device and one or more other cells than this cell.

The terminal device sends the first data transmission information to the first access network device corresponding to the cell in which the terminal device is currently located. In some embodiments, the terminal device may use the first identifier as a part of a data packet header and add the uplink data to the data packet, and then send the data packet to the first access network device. In some other embodiments, the terminal device may add the first identifier to a radio resource control (RRC) message, and send the RRC message together with data to the first access network device.

Previous to this, the terminal device needs to send a preamble sequence to the first access network device, where the preamble sequence is used to instruct the first access network device to allocate a resource to the terminal device based on the preamble sequence, and after receiving the resource, the terminal device transmits the first identifier and the uplink data by using the resource. At the same time, the first radio access network allocates a second identifier to the terminal device when allocating the transmission resource.

The second identifier is a dedicated identifier that is allocated by the first access network device to the terminal device for use in the current cell.

Step 203: The first access network device performs first processing on the received uplink data based on the channel configuration information of the terminal device.

After receiving the first identifier in the first data transmission information sent by the terminal device, the first access network device needs to further send the first identifier to the terminal device, so that the terminal device determines that the first access network device receives the first identifier. After receiving the first identifier, the terminal device determines to use the second identifier as the dedicated identifier in the cell of the terminal device.

In addition, the first access network device performs the first processing on the received uplink data based on the channel configuration information of the terminal device, where the channel configuration information may be obtained in the following three manners:

Manner 1: Read predefined channel configuration information. For example, the first access network device presets predefined channel configuration information for data transmission of a third-state terminal device.

Manner 2: Receive a channel configuration index from the terminal device, and determine the channel configuration information of the terminal device based on the channel configuration index.

In some embodiments, the anchor access network device preconfigures the channel configuration index for the terminal device, and sends the channel configuration index to the terminal device in step 201. In addition, in step 201b, the first access network device obtains the channel configuration index and a channel configuration parameter from the anchor access network device, and the first access network device determines, based on the channel configuration index received from the terminal device, the channel configuration parameter used by the terminal device.

Manner 3: Obtain the channel configuration information from the anchor access network device. After receiving the first identifier, the terminal device requests the channel configuration information of the terminal device from the anchor access network device, and obtains the channel configuration information.

In some embodiments, the first processing performed by the first access network device on the received uplink data based on the channel configuration information of the terminal device includes at least one of the following: physical layer processing, MAC layer processing, and RLC layer processing. In addition, the first processing includes no decryption and/or integrity check.

For a specific method for each layer processing, refer to the prior art. For example:

The physical layer processing may include: performing operations by using a hybrid automatic repeat request (HARQ), such as data transmission and combination, power control, mapping from a transmission channel to a physical channel, and frequency and time synchronization.

The MAC layer processing may include: mapping from a logical channel to a physical channel, data scheduling, scheduling information reporting, random access procedure processing, logical channel priority management, error correction by using a HARQ mechanism, and the like.

The RLC layer processing may include: performing error correction by using an automatic repeat request (ARQ) mechanism, and performing segmentation, concatenation, reordering, and the like on data.

Step 204: The first access network device sends second data transmission information to the anchor access network device, where the second data transmission information carries the first identifier and uplink data obtained after the first processing.

In some embodiments, before step 204, there are two steps: 201a and 201b.

Step 201a: Establish a common channel between the anchor access network device and the first access network device.

Step 201b: Configure, between the anchor access network device and the first access network device, channel configuration information used to perform data transmission.

In some embodiments, step 201a and step 201b may be performed simultaneously or any one of the steps may be performed.

In some embodiments, in step 204, the first access network device sends the second data transmission information to the anchor access network device in the following two manners:

Manner 1: The first access network device sends the second data transmission information to the anchor access network device by using the common channel pre-established in step 201a and/or the channel configuration information preconfigured in step 201b.

The common channel established in step 201a enables data transmission between the anchor access network device and the first access network device. Data packets of all third-state terminal devices between the anchor access network device and the first access network device may be transmitted through the common channel.

In step 201b, the configured channel configuration information used by the third-state terminal device to perform data transmission includes a channel configuration parameter and index information. The channel configuration parameter includes at least one or a combination of the following used by the terminal device: a logical channel number, a MAC layer, RLC layer configuration information, and PDCP layer configuration information. The index information is used to indicate the channel configuration parameter.

The first access network device uses the pre-established common channel and/or the preconfigured channel configuration information used by the third-state terminal device to perform data transmission, so that a transmission delay of data transmission between the first access network device and the anchor access network device is reduced. In addition, this method works for all terminal devices, it is unnecessary to establish data transmission channels and/or configure channel configuration information for different terminals, and therefore signaling resources are saved.

Manner 2: The first access network device sends a context request message to the anchor access network device, and sends the second data transmission information to the anchor access network device by adding the second data transmission information to the context request message.

Step 205: The anchor access network device performs second processing on the received uplink data.

In some embodiments, the second processing includes at least one of the following processing: MAC layer processing, RLC layer processing, and PDCP layer processing. The PDCP layer processing mainly processes an RRC message from a control plane and an IP packet from a data plane, including: header compression and decompression (only robust header compression (ROHC) is used) of user plane data, encryption and decryption of user plane data and control plane data, integrity protection of control plane data, transmission of user plane data and control plane data, data reordering and retransmission processing during switching, and the like.

Step 206: The anchor access network device sends uplink data obtained after the second processing to a core network device.

After the uplink data initiated by the terminal device is transmitted to the core network device, In some embodiments, the core network device may further continue to initiate downlink data transmission.

In some embodiments, step 207: After receiving the uplink data obtained after the second processing, the core network device sends downlink data to the anchor access network device.

In some embodiments, step 208: The anchor access network device performs third processing on the received downlink data.

The third processing is similar to the second processing, and includes at least one of the following: MAC layer processing, RLC layer processing, and PDCP layer processing. Details are not described herein.

In some embodiments, step 209: The anchor access network device sends third data transmission information to the first access network device. The third data transmission information carries the first identifier and downlink data obtained after the third processing.

In some embodiments, step 210: The first access network device performs fourth processing on the received downlink data.

The fourth processing is similar to the first processing, and includes at least one of the following: physical layer processing, MAC layer processing, and RLC layer processing. In addition, the fourth processing includes no decryption and/or integrity check. Details are not described herein.

In some embodiments, step 211: The first access network device sends downlink data obtained after the fourth processing to the terminal device. The downlink data obtained after the fourth processing is sent to the terminal device based on a second identifier, and the terminal device receives the data by using the second identifier.

In some embodiments, step 212: The terminal device stops monitoring the second identifier based on a specific condition, and ends a data transmission process.

In some embodiments, a condition for the terminal device to end the data transmission process is as follows:

After receiving downlink data, the terminal device receives no more downlink data, and has no uplink data to send in a period of time; or the terminal device receives a release instruction message sent by the base station, where the release instruction message instructs the terminal device to stop monitoring the second identifier.

In this embodiment, when the third-state terminal device in a moving process needs to send data, or needs to communicate with the anchor access network device and the first access network device, functions of the anchor access network device and the first access network device and a data transmission procedure are re-divided. In this embodiment of this application, data and the first identifier for identifying the anchor access network device are carried in the data transmission information, so that the first access network device and the anchor access network device separately process the received data, and when the terminal device is in a moving process, the anchor access network device remains unchanged and the terminal device can perform data transmission, thereby avoiding a waste of signaling resources in key update of the terminal device and centralized data processing in a conventional method due to a change of the anchor access network device. In addition, a transmission delay of data transmission between the first access network device and the anchor access network device is reduced by pre-establishing the common channel and/or configuring the channel configuration information used by the third-state terminal device to perform data transmission. This method works for all terminal devices, and therefore signaling resources are saved.

Figure 3A:
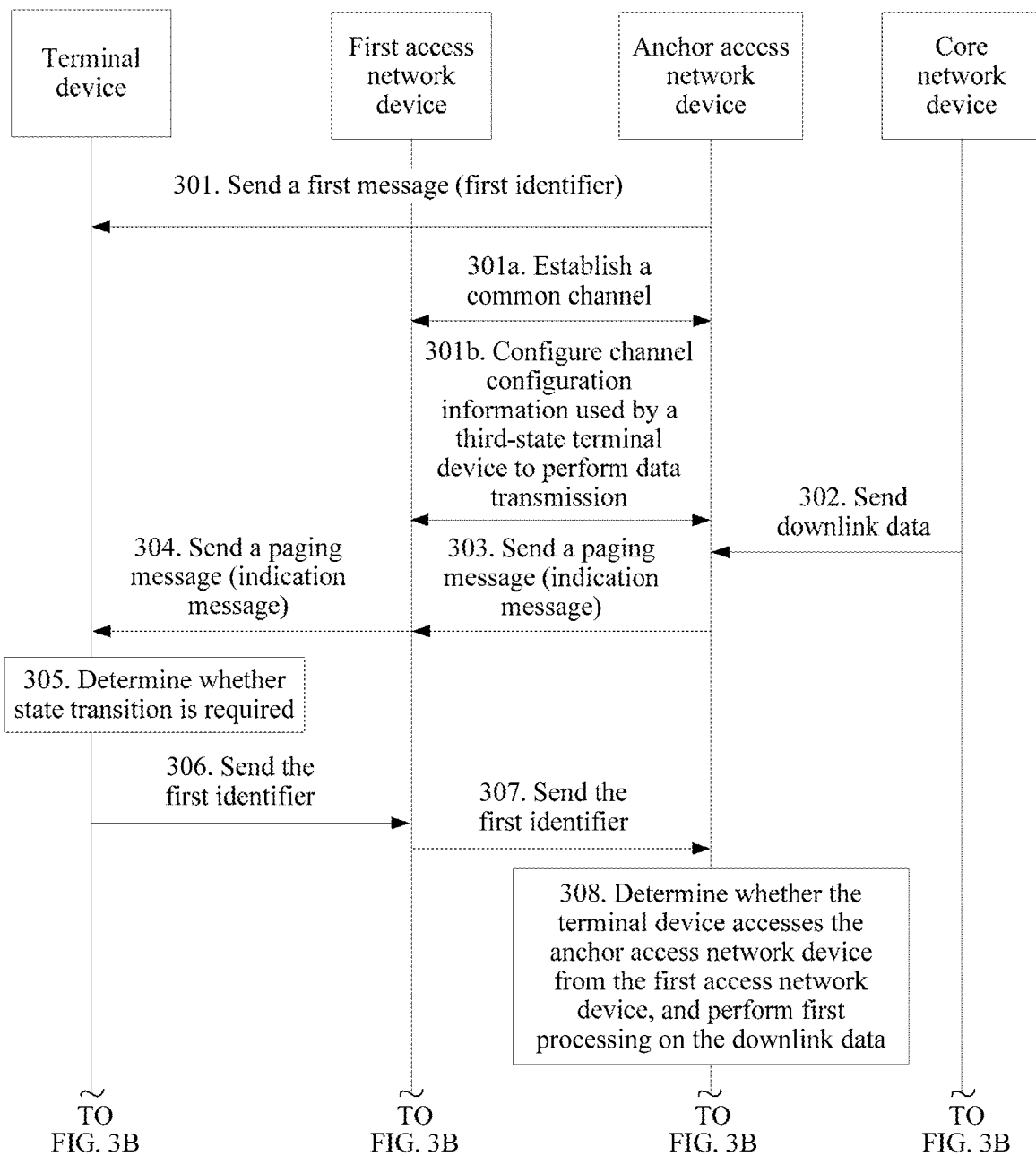
FIG. 3A and FIG. 3B are a flowchart of another communication method according to an embodiment of this application.
Figure 3B:
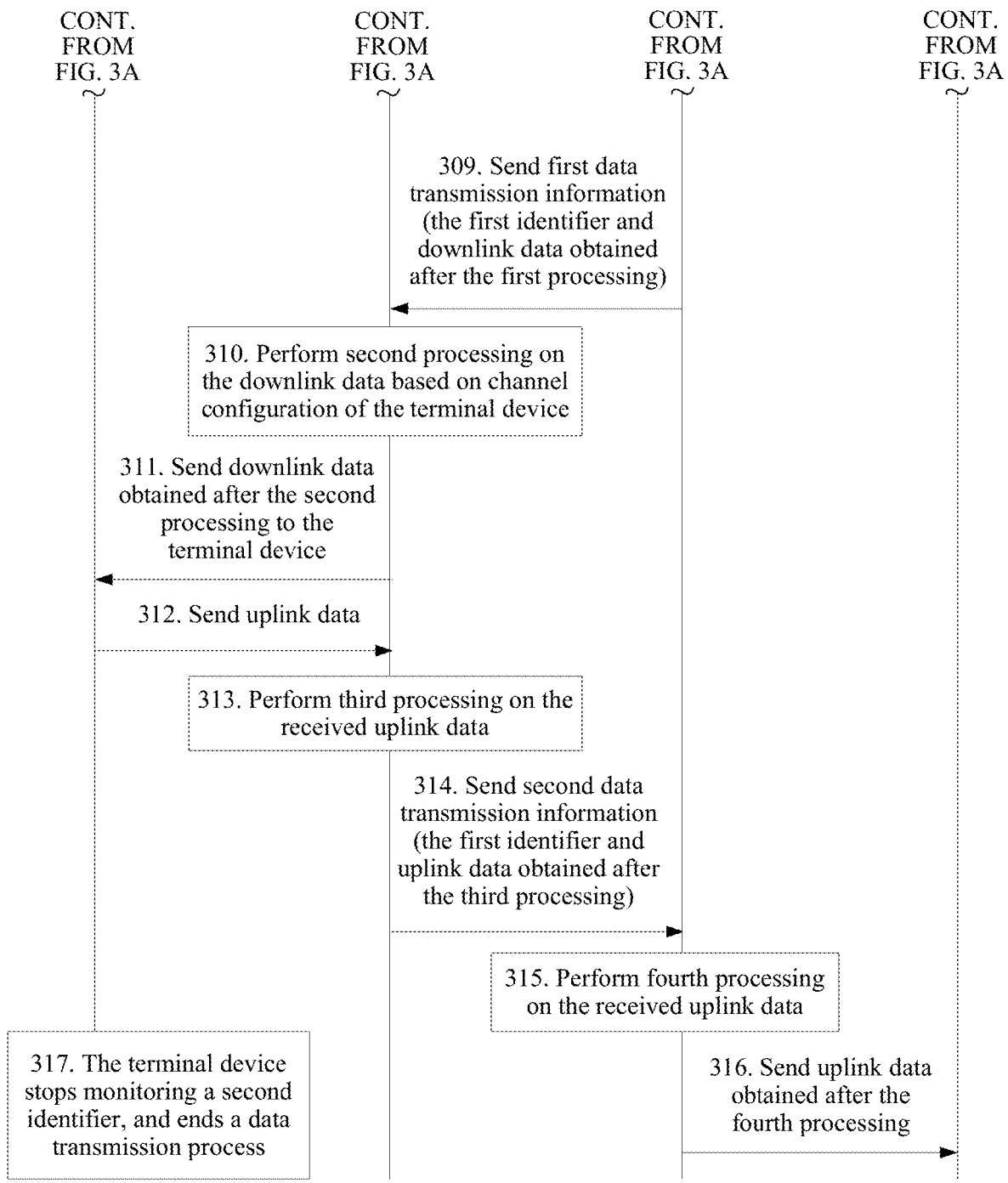

FIG. 3A and FIG. 3B show another communication method according to one embodiment. The method may be applied to the network architecture shown in FIG. 1, and the method includes the following steps.

Step 301: is the same as step 201, and details are not described herein again.

Step 302: A core network device sends downlink data to an anchor access network device.

Step 303: The anchor access network device sends a paging message to a first access network device.

Step 304: The first access network device sends a paging message to a terminal device.

Both the paging messages in steps 303 and 304 carry an indication message, to indicate whether the terminal device needs to perform state transition.

When the terminal device is in a third state, the anchor access network device is not notified when the terminal device moves inside a management area. Because the anchor access network device does not know which cell the terminal device is actually located, once the core network device sends data, a network side needs to know a specific location of the terminal device. The anchor access network device needs to first send a paging message to the terminal device in the management area, and then the first access network device sends paging to the terminal device. After receiving the paging, the terminal device initiates a paging response from a cell on which the terminal device currently camps, and a first access network device that receives the paging response notifies the anchor access network device that the first access network device receives the paging response. Accordingly, the anchor access network device may learn of the specific location of the terminal device.

Step 305: The terminal device determines, based on the indication message carried in the paging message, whether state transition is required.

After receiving the indication message in the paging message, if determining that no state transition is required, the terminal device performs a next step. If determining that state transition is required, the terminal device sends a connection restoration message to the first access network device, so that the first access network device performs state transition for the terminal device.

In the prior art, a paging message received by the terminal device has no indication information that indicates whether state transition is to be performed for the terminal device. In the foregoing steps in this embodiment of this application, indication information that indicates whether the terminal device needs to perform state transition is added to the paging message, so that the network side can control state transition of the terminal device more flexibly.

In some embodiments, step 306: The terminal device sends a first identifier to a first access network device corresponding to the cell in which the terminal device is currently located.

The network side sends data to the terminal device, and the terminal device may add the first identifier to a connection restoration message to respond to the network side, where the connection restoration message carries an indication indicating that a state of the terminal device remains unchanged. The connection restoration message is generated by the terminal device, and may be an RRC connection continuation message, an RRC connection restoration message, an area update message, or the like. The first identifier is pre-allocated to the terminal device by the anchor access network device, and includes an identifier used to identify the anchor access network device and an identifier used to identify the terminal device in the anchor access network device.

In some embodiments, the connection restoration message carries a channel information index preconfigured for the terminal device, and is sent to the first access network device. Alternatively, the first identifier may be carried in a MAC header or a MAC control element, to instruct the first access network device to keep the state of the terminal device.

In this embodiment, the terminal device is in the third state. Before entering the third state, the terminal device is in a connected state, and when the terminal device is in the connected state, an access network device corresponding to a cell in which the terminal device is located is an anchor access network device. When the terminal device enters the third state from the connected state, the anchor access network device configures a management area for the terminal device, where the management area includes a cell in which the terminal device accesses the anchor access network device and one or more other cells than this cell.

Previous to this, the terminal device needs to send a preamble sequence to a base station, where the preamble sequence is used to instruct the first access network device to allocate a resource to the terminal device based on the preamble sequence, and after receiving the resource, the terminal device transmits the first identifier by using the resource. At the same time, the first radio access network allocates a second identifier to the terminal device when allocating the transmission resource. The second identifier is a dedicated identifier that is allocated by the base station to the terminal device for use in the current cell.

In some embodiments, step 307: The first access network device sends the first identifier to the anchor access network device.

In some embodiments, step 308: The anchor access network device determines whether the terminal device accesses the anchor access network device from the first access network device, and performs first processing on the downlink data sent by the core network device.

In step 308, if determining that the terminal device accesses the anchor access network device from the first access network device, the anchor access network device performs the first processing on the downlink data sent by the core network device. In some embodiments, the first processing includes at least one of the following: MAC layer processing, RLC layer processing, and PDCP layer processing. The first processing in this step is similar to the second processing in step 205 in the previous embodiment. Details are not described herein again.

In some embodiments, step 309: The anchor access network device sends first data transmission information to the first access network device, where the first data transmission information carries the first identifier and downlink data obtained after the first processing.

In some embodiments, before step 309, there are two steps: 301*a* and 301*b*. Step 301*a* is the same as step 201*a*, and step 301*b* is the same as step 201*b*. Details are not described herein again.

In some embodiments, in step 309, the anchor access network device sends the first data transmission information to the first access network device in the following two manners:

Manner 1: The anchor access network device sends the first data transmission information to the first access network device by using a common channel pre-established in step 301*a* and/or channel configuration information preconfigured in step 301*b*.

Similar to the previous embodiment described herein, the anchor access network device uses the pre-established common channel and/or the preconfigured channel configuration information used by the third-state terminal device to perform data transmission, so that a transmission delay of data transmission between the first access network device and the anchor access network device is reduced. In addition, this method works for all terminal devices, it is unnecessary to establish data transmission channels and/or configure channel configuration information for different terminals, and therefore signaling resources are saved.

Manner 2: The anchor access network device sends a context request message to the first access network device, and sends the first data transmission information to the first access network device by adding the first data transmission information to the context request message.

In some embodiments, the first data transmission information further carries a channel configuration index of the terminal device.

In some embodiments, step 310: The first access network device performs second processing on the received downlink data based on the channel configuration information of the terminal device.

After receiving the first identifier sent by the terminal device, the first access network device needs to further send the first identifier to the terminal device, so that the terminal device determines that the first access network device receives the first identifier. After receiving the first identifier, the terminal device determines to use the second identifier as the dedicated identifier in the cell of the terminal device.

In addition, the first access network device performs, based on channel configuration of the terminal device, the second processing on the downlink data carried in the received first data transmission information, and the channel configuration is obtained in the following three manners:

Manner 1: Read predefined channel configuration information. For example, the first access network device presets predefined channel configuration information for data transmission of a third-state terminal device.

Manner 2: Receive a channel configuration index from the terminal device, and determine the channel configuration information of the terminal device based on the channel configuration index.

In some embodiments, the anchor access network device preconfigures the channel configuration index for the terminal device, and sends the channel configuration index to the terminal device in step 301. In addition, in step 301*b*, the first access network device obtains the channel configuration index and a channel configuration parameter from the anchor access network device, and the first access network device determines, based on the channel configuration index received from the terminal device, the channel configuration parameter used by the terminal device.

Manner 3: Obtain the channel configuration information from a downlink data packet header sent by the anchor access network device.

In some embodiments, the second processing includes at least one of the following: physical layer processing, MAC layer processing, and RLC layer processing. In addition, the second processing includes no decryption and/or integrity check. The second processing in this step is similar to the first processing in step 203 in the previous embodiment. Details are not described herein again.

In some embodiments, step 311: The first access network device sends the downlink data obtained after the second processing to the terminal device.

So far, the downlink data that the network side sends to the terminal device is sent to the terminal device by using the method in this embodiment of this application. If the terminal device has data to send to a network side device, the terminal device may perform the following steps.

In some embodiments, step 312: The terminal device sends uplink data to the first access network device.

In step 306, the terminal device has sent the first identifier to the first access network device and the anchor access network device. Therefore, if the terminal device wants to send uplink data once again, the terminal device does not need to send the first identifier at the same time.

In some embodiments, step 313: The first access network device performs third processing on the received uplink data.

The third processing is similar to the second processing in this embodiment, and details are not described herein again.

In some embodiments, step 314: The first access network device sends second data transmission information to the anchor access network device, where the second data transmission information carries the first identifier and uplink data obtained after the third processing.

In some embodiments, step 315: The anchor access network device performs fourth processing on the received uplink data.

The fourth processing is similar to the first processing in this embodiment, and details are not described herein again.

In some embodiments, step 316: The anchor access network device sends uplink data obtained after the fourth processing to the core network device.

In some embodiments, step 317: is the same as step 212, and details are not described herein again.

In this embodiment, the anchor access network device and the first access network device control, by using paging, whether the terminal device enters state transition, trigger data uplink access, and send data to the terminal device before or when a context of the terminal device is switched. Compared with the prior art, the network side controls state transition of the terminal device more flexibly. In addition, on the basis of the previous embodiment, in this embodiment, the third-state terminal device can keep the anchor access network device unchanged and perform data transmission in a moving process. Further, signaling and delay overheads caused in a conventional method in which a context is transferred first and then data is transmitted are avoided. This method works for data transmission of all terminal devices.

Figure 4:
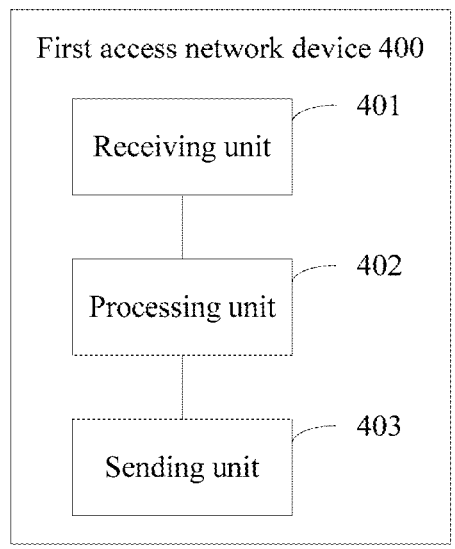
FIG. 4 is a structural diagram of a communications apparatus according to an embodiment of this application.

FIG. 4 shows a communications apparatus 400 used as a first access network device according to an embodiment of this application, and the apparatus 400 includes:

a receiving unit 401, configured to receive first data transmission information sent by a terminal device, where the first data transmission information carries a first identifier and uplink data, and the first identifier includes an identifier used to identify an anchor access network device and an identifier used to identify the terminal device in the anchor access network device;

a processing unit 402, configured to perform first processing on the received uplink data based on channel configuration information of the terminal device, where the first processing includes at least one of the following: physical layer processing, medium access control layer processing, and radio link control layer processing; in addition, the first processing includes no decryption and/or integrity check; and a sending unit 403, configured to send second data transmission information to the anchor access network device, where the second data transmission information carries the first identifier and uplink data obtained after the first processing performed by the processing unit.

In one implementation, the processing unit 402 is further configured to pre-establish a common channel with the anchor access network device and/or preconfigure channel configuration information, with the anchor access network device, used by a third-state terminal device to perform data transmission. The sending unit 403 is further configured to send the second data transmission information to the anchor access network device by using the common channel and/or the channel configuration information.

In a possible implementation, the sending unit 403 is further configured to send a context request message to the anchor access network device, and send the second data transmission information to the anchor access network device by adding the second data transmission information to the context request message.

In some embodiments, the channel configuration information may be obtained in three manners. For specific content of the three cases, refer to related content in step 203. Details are not described herein again.

In a possible implementation, the receiving unit 401 is further configured to receive third data transmission information sent by the anchor access network device, where the third data transmission information carries the first identifier and downlink data obtained after third processing. For the third processing, refer to related content in step 208. Details are not described herein again.

The processing unit 402 is further configured to perform fourth processing on the received downlink data obtained after the third processing. For the fourth processing, refer to related content in step 210. Details are not described herein again. The sending unit 403 is further configured to send, based on a second identifier, downlink data obtained after the fourth processing to the terminal device, where the second identifier is a dedicated identifier used by the terminal device in a current cell.

In this embodiment, by using the receiving unit, data and the first identifier for identifying the anchor access network device are carried in the data transmission information, so that the first access network device and the anchor access network device separately process the received data, and when the terminal device is in a moving process, the anchor access network device remains unchanged and the terminal device can perform data transmission, thereby avoiding a waste of signaling resources in key update of the terminal device and centralized data processing in a conventional method due to a change of the anchor access network device. In addition, the processing unit pre-establishes the common channel and/or configures the channel configuration information used by the third-state terminal device to perform data transmission, so that a transmission delay of data transmission between the first access network device and the anchor access network device is reduced. This method works for all terminal devices, and therefore signaling resources are saved.

Figure 5:
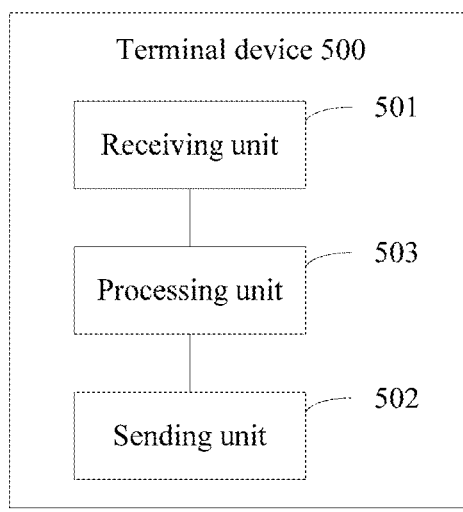
FIG. 5 is a structural diagram of a terminal device according to an embodiment of this application.

FIG. 5 shows a terminal device 500 according to an embodiment of this application, and the terminal device 500 includes:

a receiving unit 501, configured to receive a first message sent by an anchor access network device, where the first message carries a first identifier, and the first identifier includes an identifier used to identify the anchor access network device and an identifier used to identify the terminal device in the anchor access network device; and a sending unit 502, configured to send first data transmission information to a first access network device, where the first data transmission information carries the first identifier and uplink data.

In some embodiments, the first message further carries a channel configuration index.

In a possible implementation, the receiving unit 501 is further configured to receive, by using a second identifier, downlink data obtained after fourth processing performed by the first access network device. For the fourth processing, refer to related content in step 210. Details are not described herein again. The second identifier is a dedicated identifier used by the terminal device in a current cell.

In a possible implementation, a processing unit 503 is configured to: control, based on a first condition, the receiving unit 501 to stop monitoring the second identifier, and end a data transmission process.

In some embodiments, the first condition includes the following: After receiving downlink data, the receiving unit 501 receives no more downlink data, and has no uplink data to send in a period of time. Alternatively, the receiving unit 501 receives a release instruction message, where the release instruction message instructs the receiving unit 501 to stop monitoring the second identifier.

Figure 6:
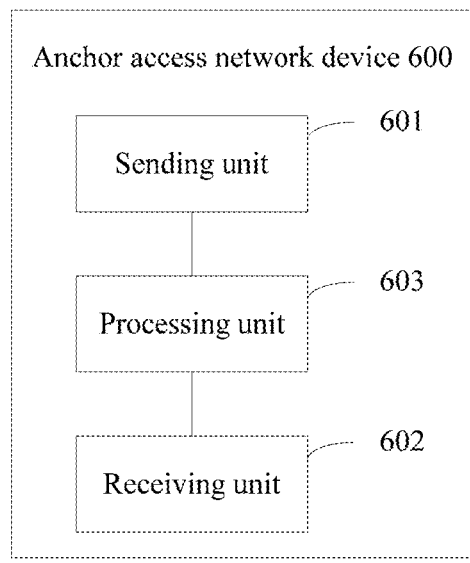
FIG. 6 is a structural diagram of another communications apparatus according to an embodiment of this application.

FIG. 6 shows a communications apparatus 600 used as an anchor access network device according to an embodiment of this application, and the communications apparatus 600 includes:

a sending unit 601, configured to send a first message to a terminal device, where the first message carries a first identifier, and the first identifier includes an identifier used to identify the anchor access network device and an identifier used to identify the terminal device in the anchor access network device;

a receiving unit 602, configured to receive second data transmission information sent by a first access network device, where the second data transmission information carries the first identifier and uplink data obtained after first processing performed by the first access network device, and the first processing includes at least one of the following: physical layer processing, medium access control layer processing, and radio link control layer processing; in addition, the first processing includes no decryption and/or integrity check; and a processing unit 603, configured to perform second processing on the uplink data obtained after the first processing, where the second processing includes at least one of the following: medium access control layer processing, radio link control layer processing, and packet data convergence protocol layer processing.

The sending unit 601 is further configured to send uplink data obtained after the second processing to a core network device.

In one implementation, the processing unit 603 is further configured to pre-establish a common channel with the first access network device and/or preconfigure channel configuration information, with the first access network device, used by a third-state terminal device to perform data transmission. The receiving unit 602 is further configured to receive, by using the common channel and/or the channel configuration information, the second data transmission information sent by the first access network device.

In one implementation, the receiving unit 602 is further configured to receive a context request message sent by the first access network device, where the second data transmission information is carried in the context request message.

In one implementation, the receiving unit 602 is further configured to receive downlink data sent by the core network device.

The processing unit is further configured to perform third processing on the received downlink data. For the third processing, refer to related content in step 208. Details are not described herein again. The sending unit 601 is further configured to send third data transmission information to the first access network device, where the third data transmission information carries the first identifier and downlink data obtained after the third processing.

Figure 7:
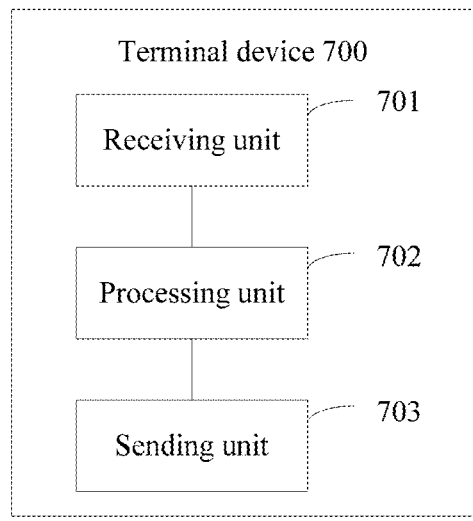
FIG. 7 is a structural diagram of another terminal device according to an embodiment of this application.

FIG. 7 is a terminal device 700 according to an embodiment of this application, and the terminal device 700 includes:

a receiving unit 701, configured to receive a first message sent by an anchor access network device, where the first message carries a first identifier, and the first identifier includes an identifier used to identify the anchor access network device and an identifier used to identify the terminal device in the anchor access network device; and configured to receive a paging message sent by a first access network device, where the paging message carries an indication message, to indicate whether state transition needs to be performed; and a processing unit 702, configured to determine, based on the indication message, whether state transition needs to be performed.

In some embodiments, the first message further carries a channel configuration index.

In a possible implementation, the processing unit 702 is further configured to determine, based on the indication message, that state transition does not need to be performed; and a sending unit 703 is configured to send the first identifier to the first access network device.

In some embodiments, the first identifier is carried in a connection restoration message, and the connection restoration message further carries an indication indicating that a state of the terminal device remains unchanged. Alternatively, the first identifier is carried in a medium access control header or a medium access control control element.

In one implementation, the receiving unit 701 is further configured to receive, by using a second identifier, downlink data obtained after second processing performed by the first access network device. For the second processing, refer to related content in step 310. Details are not described herein again. The second identifier is a dedicated identifier used by the terminal device in a current cell.

In one implementation, the sending unit 703 is configured to send uplink data to the first access network device.

In one implementation, the processing unit 702 is further configured to: control, based on a first condition, the receiving unit 701 to stop monitoring the second identifier, and end a data transmission process.

In some embodiments, the first condition includes the following: After receiving downlink data, the receiving unit 701 receives no more downlink data, and has no uplink data to send in a period of time. Alternatively, the receiving unit 701 receives a release instruction message, where the release instruction message instructs the receiving unit 701 to stop monitoring the second identifier.

In this embodiment, the receiving unit receives a paging message with state transition, so that the processing unit determines, based on an indication message, whether to perform state transition. Compared with the prior art, a network side controls state transition of the terminal device more flexibly.

Figure 8:
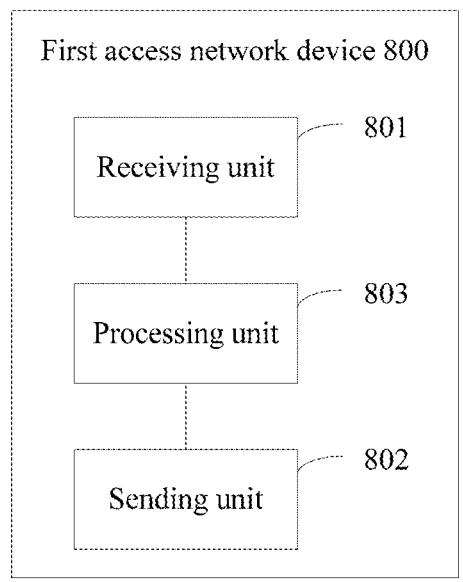
FIG. 8 is a structural diagram of another communications apparatus according to an embodiment of this application.

FIG. 8 shows a communications apparatus 800 used as a first access network device according to an embodiment of this application, and the communications apparatus 800 includes:

a receiving unit 801, configured to receive a paging message sent by an anchor access network device, where the paging message carries an indication message, to indicate whether a terminal device needs to perform state transition; and a sending unit 802, configured to send the paging message to the terminal device.

In one implementation, the receiving unit 801 is configured to receive a first identifier sent by the terminal device, where the first identifier includes an identifier used to identify the anchor access network device and an identifier used to identify the terminal device in the anchor access network device. The sending unit 802 is configured to send the first identifier to the anchor access network device.

In one implementation, the receiving unit 801 is configured to receive first data transmission information sent by the anchor access network device, where the first data transmission information carries the first identifier and downlink data obtained after first processing performed by the anchor access network device. For the first processing, refer to related content in step 308. Details are not described herein again.

In one implementation, a processing unit 803 is configured to pre-establish a common channel with the first access network device and/or preconfigure channel configuration information, with the first access network device, used by a third-state terminal device to perform data transmission. The receiving unit 801 is further configured to receive, by using the common channel and/or the channel configuration information, the first data transmission information sent by the anchor access network device.

In one implementation, the receiving unit 801 is configured to receive a context request message sent by the anchor access network device, where the first data transmission information is carried in the context request message.

In some embodiments, the first data transmission information further carries a channel configuration index of the terminal device.

In one implementation, the processing unit 803 is configured to perform, based on the channel configuration information of the terminal device, second processing on downlink data obtained after the first processing. For the second processing, refer to related content in step 310. Details are not described herein again.

In some embodiments, the channel configuration information may be obtained in three manners. For specific content of the three cases, refer to related content in step 310. Details are not described herein again.

In one implementation, the sending unit 802 is further configured to send, based on a second identifier, downlink data obtained after the second processing to the terminal device, where the second identifier is a dedicated identifier used by the terminal device in a current cell. The receiving unit 801 is further configured to receive uplink data sent by the terminal device.

In one implementation, the processing unit 803 is further configured to perform third processing on the received uplink data. For the third processing, refer to related content in step 313. Details are not described herein again. The sending unit 802 is further configured to send second data transmission information to the anchor access network device, where the second data transmission information carries the first identifier and uplink data obtained after the third processing.

In this embodiment, the first access network device controls, by using paging, whether the terminal device enters state transition, triggers data uplink access, and sends data to the terminal device before or when a context of the terminal device is switched. Compared with the prior art, a network side controls state transition of the terminal device more flexibly. In addition, on the basis of the previous embodiment, in this embodiment of this application, the third-state terminal device can keep the anchor access network device unchanged and perform data transmission in a moving process. Further, signaling and delay overheads caused in a conventional method in which a context is transferred first and then data is transmitted are avoided. This method works for data transmission of all terminal devices.

Figure 9:
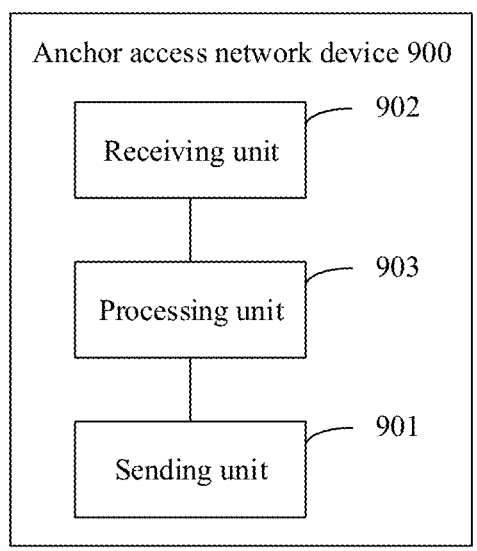
FIG. 9 is a structural diagram of another communications apparatus according to an embodiment of this application.

FIG. 9 shows a communications apparatus 900 used as an anchor access network device according to an embodiment of this application, and the communications apparatus 800 includes:

a sending unit 901, configured to send a first message to a terminal device, where the first message carries a first identifier, and the first identifier includes an identifier used to identify the anchor access network device and an identifier used to identify the terminal device in the anchor access network device; and a receiving unit 902, configured to receive downlink data sent by a core network device.

The sending unit 901 is further configured to send a paging message to a first access network device, where the paging message carries an indication message, to indicate whether the terminal device needs to perform state transition.

In one implementation, the receiving unit 902 is further configured to receive the first identifier sent by the first access network device. A processing unit 903 is configured to determine whether the terminal device accesses the anchor access network device from the first access network device, and perform first processing on the downlink data received from the core network device. For the first processing, refer to related content in step 308. Details are not described herein again.

In one implementation, the sending unit 901 is configured to send first data transmission information to the first access network device, where the first data transmission information carries the first identifier and downlink data obtained after the first processing.

In one implementation, the processing unit 903 is configured to pre-establish a common channel with the first access network device and/or preconfigure channel configuration information, with the first access network device, used by a third-state terminal device to perform data transmission. The sending unit 901 is configured to send the first data transmission information to the first access network device by using the common channel and/or the channel configuration information.

In one implementation, the sending unit 901 is configured to send a context request message to the first access network device, where the first data transmission information is carried in the context request message.

In one implementation, the receiving unit 902 is configured to receive second data transmission information sent by the first access network device, where the second data transmission information carries the first identifier and uplink data obtained after third processing. For the third processing, refer to related content in step 313. Details are not described herein again.

The processing unit 903 is configured to perform fourth processing on the uplink data obtained after the third processing, where the fourth processing includes at least one of the following: MAC layer processing, RLC layer processing, and PDCP layer processing.

The sending unit 901 is configured to send uplink data obtained after the fourth processing to the core network device.

Figure 10:
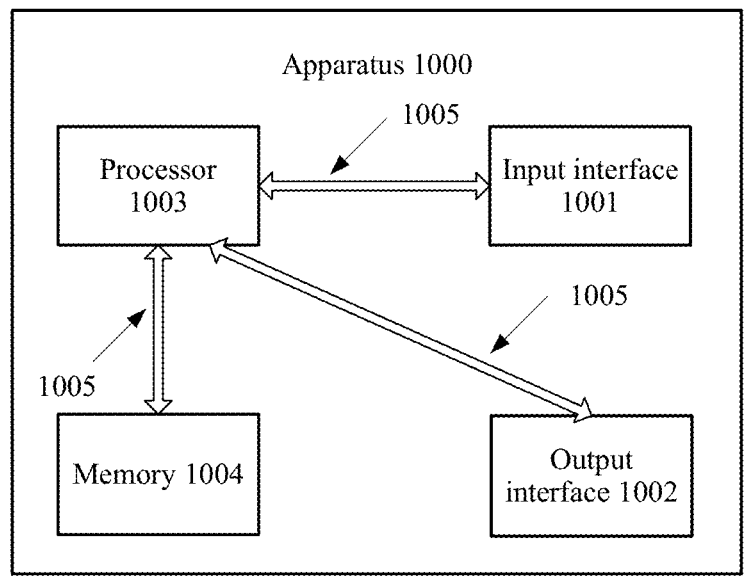
FIG. 10 is a structural diagram of another communications apparatus according to an embodiment of this application.

FIG. 10 is another schematic diagram of a communications apparatus 1000 according to an embodiment of this application. As shown in FIG. 10, the apparatus 1000 may be the first access network device or the anchor access network device in the foregoing embodiment, and includes an input interface 1001, an output interface 1002, a processor 1003, and a memory 1004. The input interface 1001, the output interface 1002, the processor 1003, and the memory 1004 may be connected by using a bus system 1005. In some embodiments, the input interface and the output interface may be omitted.

The memory 1004 is configured to store a program, an instruction, or code. The processor 1003 is configured to execute the program, the instruction, or the code in the memory 1004, to control the input interface 1001 to receive a signal, control the output interface 1002 to send a signal, and perform steps and functions implemented by the first access network device or the anchor access network device in the implementations corresponding to FIG. 2A, FIG. 2B, FIG. 3A, and FIG. 3B. Details are not described herein again. For specific implementations of the input interface 1001, the output interface 1002, and the processor 1003, refer to the specific descriptions of the receiving units 401, 602, 801, and 902, the sending units 403, 601, 802, and 901, and the processing units 402, 603, 803, and 903 in FIG. 4, FIG. 6, FIG. 8, and FIG. 9. Details are not described herein again.

It should be understood that in this embodiment of this application, the processor 1003 may be a central processing unit (CPU), or the processor 1003 may be another general purpose processor, a digital signal processor (DSP), an application-specific integrated circuit (ASIC), a field programmable gate array (FPGA), or another programmable logic device, a discrete gate or transistor logic device, a discrete hardware component, or the like. The general purpose processor may be a microprocessor, or the processor may be any conventional processor or the like.

The memory 1004 may include a read-only memory and a random access memory, and provide an instruction and data to the processor 1003 separately. A part of the memory 1004 may further include a non-volatile random access memory. For example, the memory 1004 may further store information of a device type.

The bus system 1005 may further include a power bus, a control bus, a status signal bus, and the like, in addition to a data bus. However, for clear description, various types of buses in the figure are marked as the bus system.

In an implementation process, the steps of the methods described in FIG. 2A, FIG. 2B, FIG. 3A, and/or FIG. 3B may be completed by using an integrated logic circuit of hardware in the processor 1003 or an instruction in a form of software. The steps of the method disclosed with reference to the embodiments of this application may be directly performed by a hardware processor, or may be performed by using a combination of hardware in the processor and a software unit. The software unit may be located in mature storage media in the art, such as a random access memory, a flash memory, a read-only memory, a programmable read-only memory, an electrically erasable programmable memory, a register, or the like. The storage media are located in the memory 1004. The processor 1003 reads information in the memory 1004 and completes the steps of the method in FIG. 2A, FIG. 2B, FIG. 3A, and/or FIG. 3B in combination with hardware of the processor 1003. To avoid repetition, details are not described herein again.

It should be noted that in a specific implementation, the processing units in FIG. 4, FIG. 6, FIG. 8, and FIG. 9 may be implemented by a processor similar to the processor 1003 in FIG. 10, the sending units may be implemented by a transmitter, and the receiving units may be implemented by a receiver.

Figure 11:
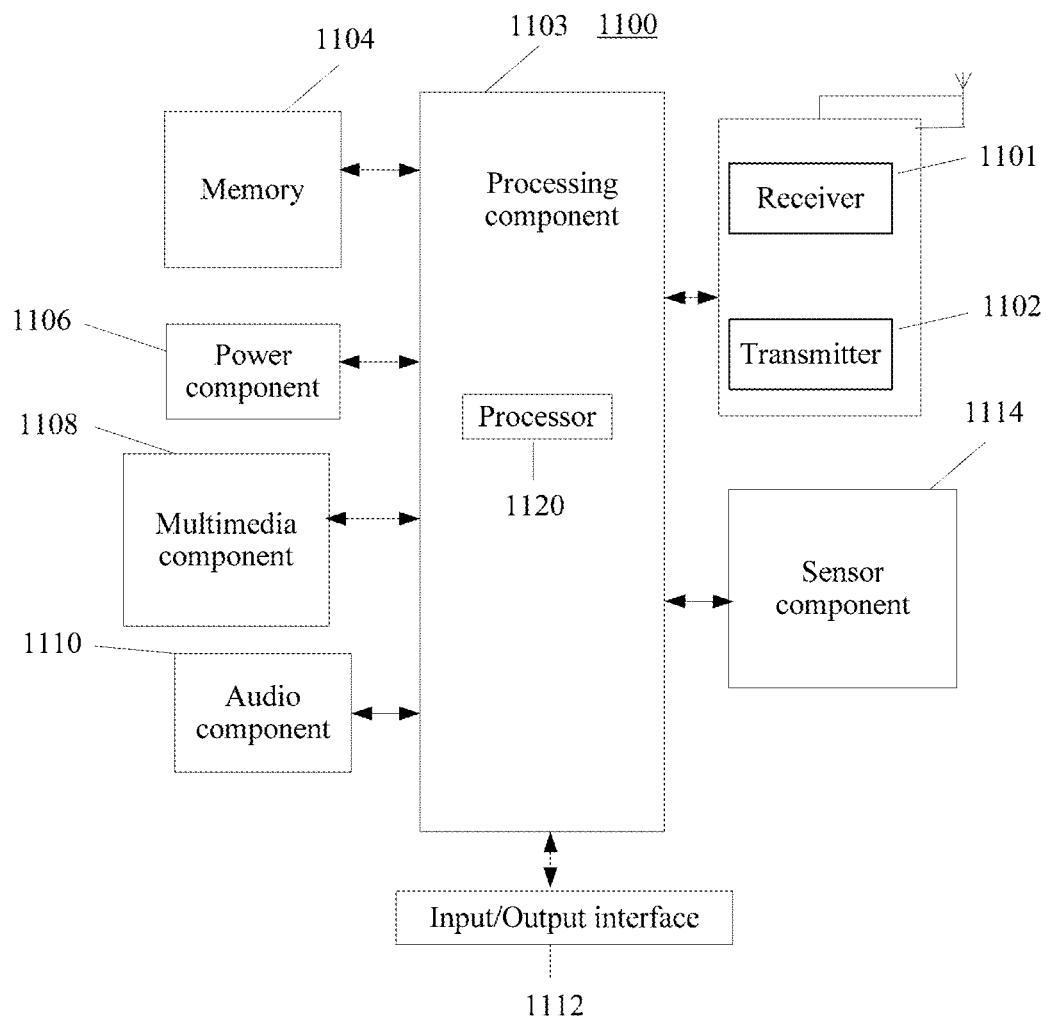
FIG. 11 is a structural diagram of another terminal device according to an embodiment of this application.

FIG. 11 is a block diagram of a terminal device 1100 according to an example embodiment. The terminal device 1100 may a mobile phone, a computer, a tablet device, or the like.

Referring to FIG. 11, the terminal device 1100 may include one or more of the following components: a receiver 1101, a transmitter 1102, a processing component 1103, a memory 1104, a power component 1106, a multimedia component 1108, an audio component 1110, an input/output (I/O) interface 1112, and a sensor component 1114. In addition, the foregoing plurality of components may be connected to one another by using a system bus.

The processing component 1103 usually controls an overall operation of the terminal device 1100, such as an operation related to display, a telephone call, data communication, a camera operation, or a recording operation. The processing component 1103 may include one or more processors 1120 to execute an instruction, to complete all or some of the steps of the foregoing method. In addition, the processing component 1103 may include one or more modules, for convenience of interaction between the processing component 1103 and another component. For example, the processing component 1103 may include a multimedia module, for convenience of interaction between the multimedia component 1108 and the processing component 1103.

The memory 1104 is configured to store various types of data to support an operation on the terminal device 1100. For example, the data includes an instruction of any application program or method to be operated on the terminal device 1100, contact data, address book data, a message, a picture, a video, or the like. The memory 1104 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The power component 1106 supplies power to various components of the terminal device 1100. The power component 1106 may include a power management system, one or more power supplies, and other components associated with power generation, management, and distribution for the terminal device 1100.

The multimedia component 1108 includes a screen that provides an output interface between the terminal device 1100 and a user. In some embodiments, the screen may include a liquid crystal display (LCD) and a touch panel (TP). If the screen includes the touch panel, the screen may be implemented as a touchscreen, to receive an input signal from the user. The touch panel includes one or more touch sensors to sense a touch, a slide, and a gesture on the touch panel. The touch sensor may not only sense a boundary of a touch action or a slide action, but also detect a duration and pressure related to the touch operation or the slide operation. In some embodiments, the multimedia component 1108 includes a front camera and/or a rear camera. When the terminal device 1100 is in an operation mode, such as a shooting mode or a video mode, the front camera and/or the rear camera may receive external multimedia data. Each front camera or rear camera may be a fixed optical lens system that has a focal length and an optical zoom capability.

The audio component 1110 is configured to output and/or input an audio signal. For example, the audio component 1110 includes one microphone (MIC). When the terminal device 1100 is in an operation mode, such as a call mode, a recording mode, or a voice recognition mode, the microphone is configured to receive an external audio signal. The received audio signal may be further stored in the memory 1104 or sent by using a communications component 1116. In some embodiments, the audio component 1110 further includes a speaker, configured to output an audio signal.

The I/O interface 1112 provides an interface between the processing component 1103 and a peripheral interface module, and the peripheral interface module may be a keyboard, a click wheel, a button, or the like. These buttons may include but are not limited to, a home button, a volume button, a startup button, and a lock button.

The sensor component 1114 includes one or more sensors, configured to provide various aspects of state evaluation for the terminal device 1100. For example, the sensor component 1114 can detect an on/off state of the terminal device 1100 and relative positioning of components, and the components are, for example, a display and a keypad of the terminal device 1100. The sensor component 1114 can further detect a location change of the terminal device 1100 or of a component of the terminal device 1100, existence or nonexistence of contact between the user and the terminal device 1100, an orientation or acceleration/deceleration of the terminal device 1100, and a temperature change of the terminal device 1100. The sensor component 1114 may include a proximity sensor, configured to detect existence of a nearby object when there is no physical contact. The sensor component 1114 may further include an optical sensor, such as a CMOS or CCD image sensor, configured for use in imaging application. In some embodiments, the sensor component 1114 may further include an acceleration sensor, a gyro sensor, a magnetic sensor, a pressure sensor, or a temperature sensor.

The receiver 1101 and the transmitter 1102 are configured to facilitate wired or wireless communication between the terminal device 1100 and another device. The terminal device 1100 may connect to a communication-standard-based wireless network, such as Wi-Fi, 2G, 3G, or a combination thereof.

In an example embodiment, the terminal device 1100 may be implemented by one or more of the following: an application specific integrated circuit (ASIC), a digital signal processor (DSP), a digital signal processing device (DSPD), a programmable logic device (PLD), a field programmable gate array (FPGA), a controller, a microcontroller, a microprocessor, or another electronic component, and is configured to perform the foregoing method.

It should be noted that in a specific implementation, the processing unit in FIG. 5 or the processing unit in FIG. 7 may be implemented by the processor 1120 in FIG. 11, the sending unit in FIG. 5 or the sending unit in FIG. 7 may be implemented by the transmitter 1102 in FIG. 11, and the receiving unit in FIG. 5 or the receiving unit in FIG. 7 may be implemented by the receiver 1101 in FIG. 11.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Drive (SSD)), or the like.

The foregoing descriptions are merely specific examples of this application, but are not intended to limit this application. Any modification, equivalent replacement, or improvement made without departing from the spirit and principle of this application should fall within the protection scope of this application.

What is claimed is:

1. A terminal device, comprising:
a processor; and
a non-transitory computer-readable storage medium coupled to the processor and storing programming instructions for being executed by the processor, the programming instructions, when executed, instruct the processor to:
receive a first message sent by an anchor access network device, wherein the first message carries a first identifier, and the first identifier comprises an identifier identifying the anchor access network device and an identifier identifying the terminal device in the anchor access network device;
send first data transmission information to a first access network device, wherein the first data transmission information carries the first identifier and uplink data;
receive, by using a second identifier, downlink data obtained after processing performed by the first access network device, wherein the second identifier is a dedicated identifier used by the terminal device in a current cell; and
the processing performed by the first access network device comprises at least one of the following: physical layer processing, medium access control layer processing, or radio link control layer processing and, wherein, the processing performed by the first access network device comprises no decryption and/or integrity check.

2. The terminal device according to claim 1, wherein the first message further carries a channel configuration index.

3. The terminal device according to claim 1, wherein the programming instructions further instruct the processor to:
control, based on a first condition, the processor to stop monitoring the second identifier, and end a data transmission process.

4. The terminal device according to claim 3, wherein the first condition comprises the following:
after receiving downlink data, the programming instructions further instruct the processor to:
stop receiving downlink data, and stop sending uplink data in a period of time; or
receive a release instruction message, wherein the release instruction message instructs the processor to stop monitoring the second identifier.

* * * * *